No. 885,302. PATENTED APR. 21, 1908.
J. M. SMITH.
COMBINED TRUCK AND JACK.
APPLICATION FILED JULY 19, 1907.
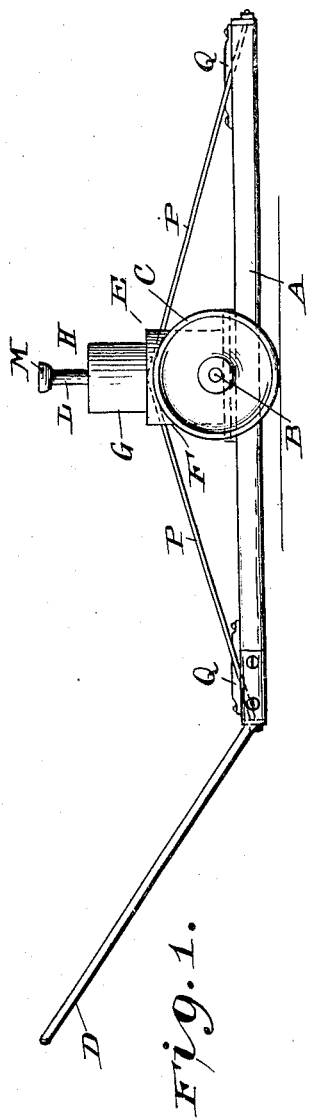
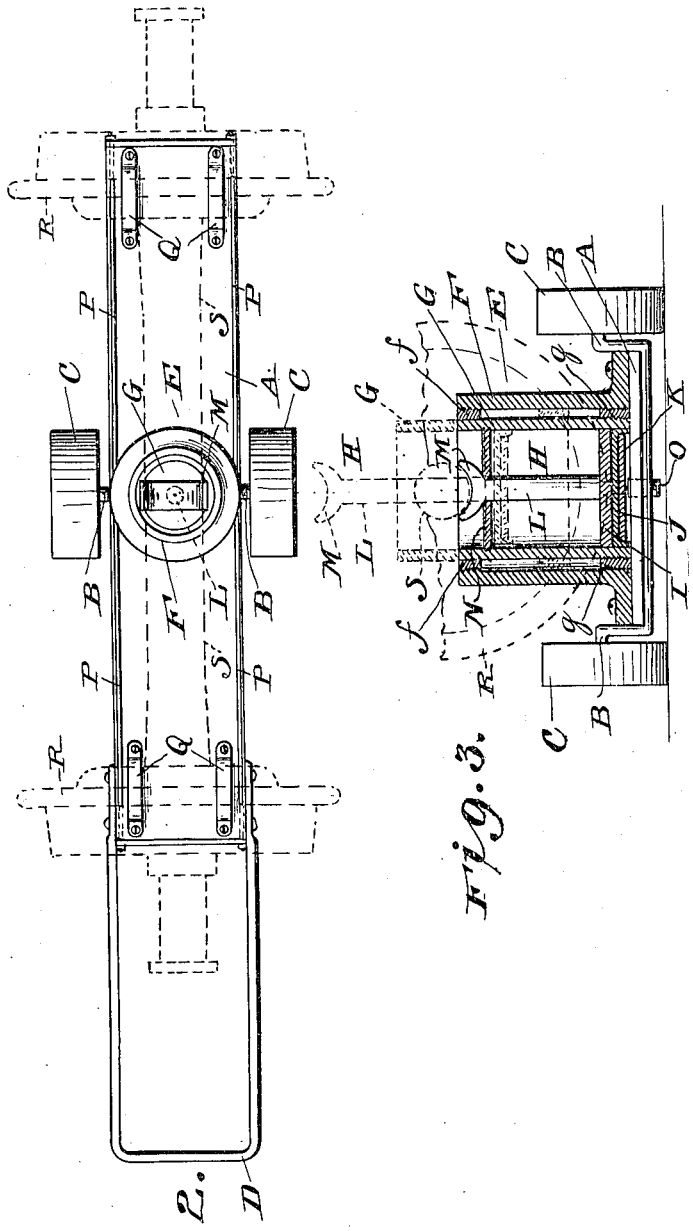
WITNESSES:
INVENTOR
BY
Attorney

UNITED STATES PATENT OFFICE.

JOHN M. SMITH, OF WAITE PARK, MINNESOTA, ASSIGNOR OF ONE-HALF TO FRED C. LINDT, OF ST. CLOUD, MINNESOTA.

COMBINED TRUCK AND JACK.

No. 885,302.     Specification of Letters Patent.     Patented April 21, 1908.

Application filed July 19, 1907. Serial No. 384,598.

*To all whom it may concern:*

Be it known that I, JOHN M. SMITH, a citizen of the United States, residing at Waite Park, in the county of Stearns and State of Minnesota, have invented certain new and useful Improvements in Combined Trucks and Jacks, of which the following is a specification.

My invention relates to devices for handling car wheels and has for its object the provision of an elongated platform truck having a jack secured in its middle, two wheels journaled opposite said middle portion, and a handle secured at one end of the platform to operate the truck. Cleats are provided at each end of the platform to engage the car wheels to hold them on the truck while the jack is braced by means of rods secured thereto and to the ends of the truck.

The construction and operation of my improved truck and jack will be described in detail hereinafter and illustrated in the accompanying drawings in which—

Figure 1 is a side view of my improved truck and jack, Fig. 2, a top plan view showing the car wheels in dotted lines and in position on the truck, and Fig. 3, a cross sectional view of the truck and jack with the jack in position to receive a load.

In the drawings similar reference characters indicate corresponding parts throughout the several views.

A indicates an elongated platform on the middle of which is secured the U-shaped axle B having the wheels C journaled thereon.

D indicates the handle for operating the truck secured at one end of platform A.

E indicates a jack secured on platform A between the wheels C. The jack shown in the drawings consists of two telescoping tubular members, F and G respectively, with packings, *f* and *g* secured to members F and G respectively to secure an air-tight joint between the two members. H indicates another member slidably mounted in tubular member G consisting of a disk I having a packing gland J secured to its under side by means of plate K and an upright L secured centrally of the disk and having a yoke M on its upper end.

N indicates a plate secured to member G and having a central hole to receive upright L to strengthen and guide it when the jack is in operation.

O represents a nozzle on the member F to which may be attached a tube for conveying compressed air to the jack.

P indicates braces secured to the upper end of member F and to the ends of platform A.

Q indicates cleats on the ends of the platform to engage the flanges of car wheels R to prevent them from rolling off of the platform.

S indicates the car wheel axle.

In operation my truck is run under the axle of the wheels to be moved so that the yoke M is under its middle. A compressed air conveyer is then secured to nozzle O so as to operate the jack. When the yoke M engages the axle S the car wheels R are raised and may be swung around so that they are over the ends of the platform A and when the air pressure in the jack is removed lower so as to come to rest thereon, the cleats Q preventing the wheels from rolling off of the platform.

I have shown and described a jack of the compressed air type but, except where specifically claimed, I do not wish to be confined to this structure as any other type may be substituted therefor without altering the spirit of my invention.

Having thus described my invention what I claim is—

1. A combination truck and jack comprising an elongated wheeled platform, a jack mounted on said platform and centrally thereof, the stem of the jack having a curved yoke on its upper end, substantially as shown and described.

2. A combination truck and jack comprising an elongated platform having wheels journaled centrally of its long sides, a jack mounted on the platform between the wheels, a curved yoke secured to the upper end of the stem of the jack, and cleats secured at the end of the truck and longitudinally thereof, substantially as shown and described.

3. A combined truck and jack comprising an elongated platform, a handle secured to one end thereof, cleats secured to the ends of the platform, a U-shaped axle secured under the middle of the platform, wheels journaled on said axle, a telescoping compressed-air jack secured to the platform between the wheels, and braces consisting of rods secured to the jack and the ends of the platform, substantially as shown and described.

In testimony whereof I hereto affix my signature in the presence of two witnesses.

JOHN M. SMITH.

Witnesses:
   J. I. DONOHUE,
   S. HAGEMANN.